United States Patent
Wysong

[15] 3,654,041
[45] Apr. 4, 1972

[54] SONIC WELDING APPARATUS UTILIZING VIBRATION DAMPENING MEANS

[72] Inventor: Robert D. Wysong, Goshen, Ind.
[73] Assignee: Robertshaw Controls Company, Richmond, Va.
[22] Filed: Dec. 9, 1969
[21] Appl. No.: 879,979

Related U.S. Application Data

[62] Division of Ser. No. 659,189, Aug. 8, 1967, Pat. No. 3,499,809.

[52] U.S. Cl. .................................. 156/580, 156/73, 228/1
[51] Int. Cl. .................................. B32b 31/16, B29c 27/08
[58] Field of Search ........................... 156/580, 73; 228/1

[56] References Cited

UNITED STATES PATENTS

| 3,029,666 | 4/1962 | Louins | 228/1 |
| 3,106,856 | 10/1963 | Jones et al. | 228/1 |

Primary Examiner—Benjamin A. Borchelt
Assistant Examiner—J. J. Devitt
Attorney—Auzville Jackson, Jr., Robert L. Marben and Candor, Candor & Tassone

[57] ABSTRACT

This application discloses an apparatus and method for the sonic welding of one or more flexible or vibratable blades with a blade portion of each blade held by two or more plastic holding members with a free blade portion extending out of said plastic holding members. A vibration damping means is provided to dampen the vibratable blade free portion of each of such one or more blades to prevent crystallization and fatigue of said vibratable blade or blades while said plastic holding members are being sonically welded. The vibration damping means may include a damping pad carried by one sonic welding means or base and another damping pad carried by another sonic welding means or horn. The blade or blades may each have a second free portion extending from the plastic holding members in another direction, and such second free portion may be dampened by a third damping pad.

13 Claims, 6 Drawing Figures

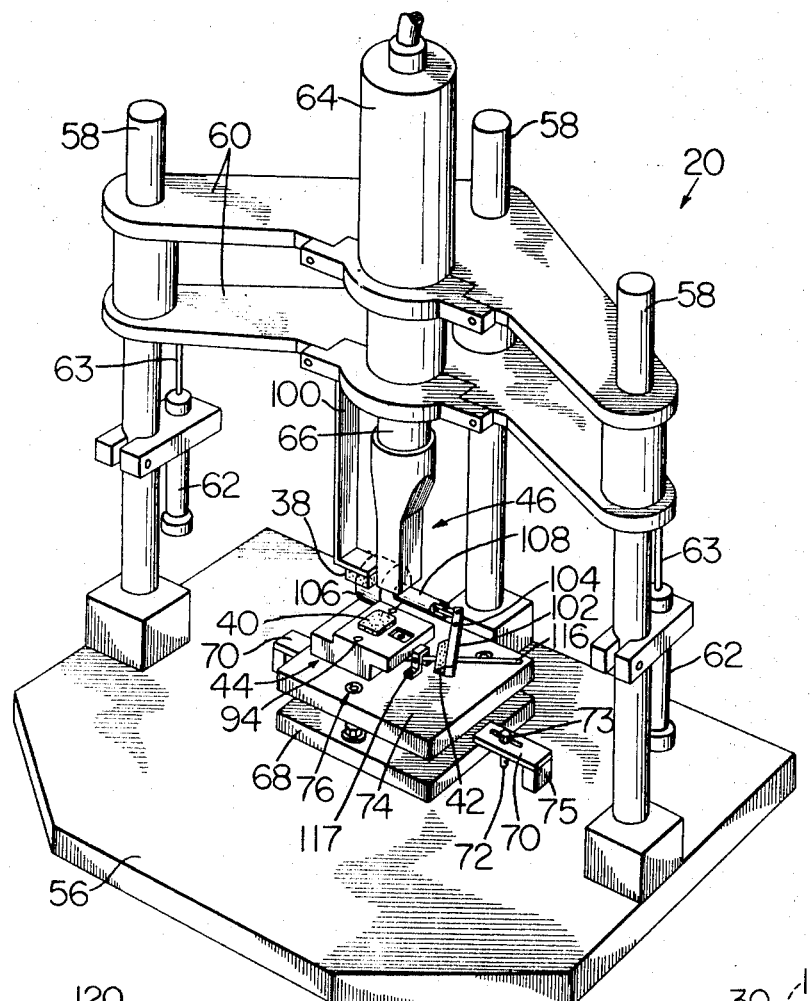

Patented April 4, 1972

INVENTOR.
ROBERT D. WYSONG

HIS ATTORNEYS

SONIC WELDING APPARATUS UTILIZING VIBRATION DAMPENING MEANS

This application is a divisional patent application of its co-pending parent application, Ser. No. 659,189, filed Aug. 8, 1967, now U.S. Pat. No. 3,499,809, granted Mar. 10, 1970, and is assigned to the same assignee to whom the parent application is assigned.

This invention relates to sonic welding means with vibration damping means and method.

A feature of this invention includes a relatively novable plural sonic welding means to engage and sonically weld a plural plastic holding member structure, said holding member structure holding one or more flexible or vibratable blades with a blade portion extending out from said plastic holding member structure, and vibration damping means to dampen such flexible or vibratable blade free portion to prevent crystallization and fatigue of the flexible or vibratable blade while said plural plastic holding member structure is being sonically welded.

Another feature of this invention includes a plurality of flexible or vibratable blades held by such plastic holding member structure with each of said blades having free blade portions extending out from such plastic holding member structure.

Another feature of this invention includes a switch construction in which such flexible or vibratable blade or blades are the switch blades in the switch construction.

Another feature of this invention includes a damping pad carried by one of the plural sonic welding means, and another damping pad carried by another of said plural damping means, such damping pads engaging the free end of one or more of said flexible or vibratable blades.

Another feature of this invention includes one or more blades having another free portion extending from the holding member structure, and a third damping pad engaging such other free portion.

Other features of this invention are apparent from this description, the appended claimed subject matter, and/or the accompanying drawings, in which:

FIG. 1 is a diagrammatic perspective view of an apparatus for sonically welding plastic holding members which hold one or more flexible blades with free end portions, and for practicing the method of this invention.

FIG. 2 is a perspective view of the plastic holding members and flexible blades in the form of a switch construction.

FIG. 3 is a diagrammatic cross section taken along line 3—3 of FIG. 2.

FIG. 4 is a diagrammatic cross section taken along the line 4—4 of FIG. 5.

Figure 5:
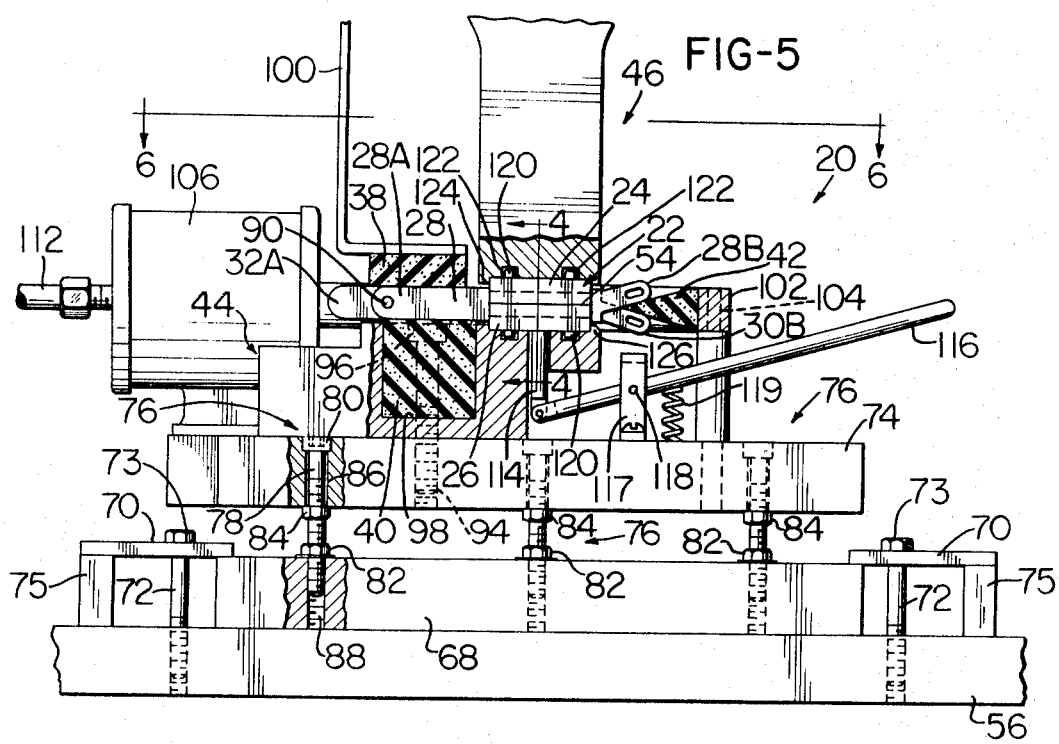
FIG. 5 is a diagrammatic cross section taken along the line 5—5 of FIG. 6.

Certain words may be used in this specification, and in the appended claimed subject matter which indicate direction, relative position, and the like. Such words are used for the sake of clearness and brevity. However, it is to be understood that such words are used in connection with views of the drawings, and that in actual use, the parts so described may have entirely different direction, relative position and the like. Such words may include "vertical", "horizontal", "upper", "lower", etc.

The word "sonic welding" is used in this specification and claimed subject matter to indicate welding by welding vibrations produced between plastic members and the like, with the vibrations having frequencies within the audible range of the human ear, but which may also be above and below such frequencies, as is well known. Such frequencies may be in the order of from 4,000 to 20,000 more or less cycles per second, and is intended to include any range of frequency that can produce the welding operations of the type herein disclosed.

This invention includes an apparatus and a method which causes a plural sonic welding means 20 to engage and sonically weld a plural plastic holding member structure 22. The said plastic holding member structure 22 may include, for example, the blade holding members 24 and 26, which structure 22 holds one or more vibratable metal blades 28, 30, 32, 34 and 36, for example.

The holding member structure 22 holds the one or more blades 28–36 with such blades having one or more free blade portions 28A, 30A, 32A, 34A, and 36A. These free blade portions 28A–36A extend out of the holding member structure 22.

A vibration damping means 38, 40 is caused to dampen such one or more free blade portions 28A–30A while said holding member structure 22 is being sonically welded by the sonic welding means 20, to prevent crystallization and fatigue of said one or more blades 28–36 while said holding member structure 22 is being welded.

The plural plastic holding members structure 22 may be any plastic structure that can hold the one or more blades 28–36. The one or more blades 28–36 may be any flexible or vibratable metal member or members which are to be held by the plural member structure 22, and which have vibration characteristics, such that they vibrate and frequently would crystallize and fatigue, except for the vibration damping means of this invention. For example, the blades 28–36 may be a plurality of switch blades more fully to be described.

Such blades 28–30 may have second free blade portions 28B, 30B, 32B, 34B, and 36B which extend oppositely or in a different direction from the first-named free blade portions 28A–36A. These second free blade portions 28B–36B may include sidewise extensions, as shown in FIGS. 2 and 3, with openings, if desired, to receive the terminals of electric lines, not shown, which are connected to any electrical system, not shown.

Another damping means 42 may be provided for damping the free blade portions 28B–36B, also to prevent crystallization and fatigue of the one or more blades 28–36, which have these free blade portions 28B–36B.

More specifically, the sonic welding means which has been indicated generally by the numeral 20 may have a first sonic welding means, or sonic welding base, 44 to engage the first plastic holding member 26 while a second sonic welding means, or horn, 46 engages the second plastic holding member 24. These first and second sonic welding means 44 and 46 impart relative sonic welding vibrations to the plastic holding members 24 and 26 sonically to weld said plastic holding members 24 and 26 with said flexible or vibratable blade or blades 28–36 held by such plastic holding members 24 and 26.

Each of the one or more blades 28–36 may have a reduced width portion 48, with shoulders 50. These reduced width portions are received in suitable grooves 52, in the plastic holding members 24 and 26, FIG. 4, which receive the reduced width portions 48 of the blades 28–36. The sonic welding means or members 44 and 46 sonically vibrate the members 24 and 26 relatively to each other, to produce a sonic weld at the inter-engaging surfaces 54 of holding members 24 and 26 caused by the frictional heat produced by the relative vibrations at said inter-engaging surfaces 54.

The sonic welding means 20 may be any sonic welding apparatus, now well known, and on the market, such as is marketed by Branson Instruments, Inc., which has a place of business at Danbury, Conn., or by other similar supplier of similar equipment. Such purchased apparatus 20 may then be modified to have the form and operation of this invention. Such modification may include the addition of the damping means 38, 40 and 42 as well as the modification of the base 44, to engage the structure herein described to be welded, and by modification of the horn 46 likewise to engage the structure being sonically welded, in accordance with this invention.

In general, the apparatus to be obtained from the supplier may include a pedestal 56 with vertical shafts 58 which slidably receive the upwardly and downwardly movable double platform structure 60, which is vertically moved up and down by fluid operated piston-cylinders 62 and rods 63, which may be controlled by suitable apparatus furnished by the supplier. The platform structure 60 may carry the sonic power unit 64, which imparts suitable sonic vibrations to the horn 46. The horn 46 is removable from the horn carrying shaft 66. Such horn 46 may be tailored, as required by the user, suitably to engage the article to be sonically welded. According to this invention, such horn is tailored to have a lower surface which suitably engages the member 24, as shown in FIGS. 4 and 5.

The pedestal 56 may be provided with a base 44 in a manner suitably to receive the plastic holding member 26.

For example, the pedestal 56 may hold a lower plate 68 by means of the clamping brackets or plates 70 and screw 72, with the screw threaded into pedestal 56 and with head 73 holding the plate 70 down on plate 68 and block 75. Another plate 74 may be held on the plate 68 by three bolt and nut constructions 76 each of which may include a screw bolt 78 with an internal hex head 80, a lock nut and washer construction 82 and a nut 84. The screw bolt 78 may be loosely held in an unthreaded opening 86, and the nut 84 may hold the plate 74 upwardly against the head 80. The screw bolt 78 may be threaded into the threaded opening 88 in plate 68, and may be locked in place by the lock nut and washer construction 82. The three nut and bolt constructions 76 may thus hold the plate 74 level and absolutely parallel with the main lower surface of the horn 46.

The switch construction 22 may be of any suitable construction, if desired. For example, the two outside blades 28 and 36 may form substantially stationary contacts, with contact buttons 90, as shown. These blades 28 and 36 may be relatively stiff but may be flexible and vibratable to a relatively small degree. The blades 30 and 34 may be the movable blades which contact the buttons 90 of blades 28 and 36. The upper blade 30 may be electrically connected to the blade 28 when the switch blade construction is in its upper position, as shown in FIG. 2, and when it is moved upwardly by the actuating blade 32. The actuating blade 32 is connected with the blades 30, 32 and 34 by the insulating plate 92. The blades 30, 32 and 34 may be downwardly biased, so that they downwardly move with the blade 34 in contact when the actuating blade 32 is released and is not upwardly actuated.

The actuating blade 32 may be moved upwardly by any suitable actuator, such as 128, and causes the blade 30 to contact the upper contact button 90.

The sonic welding base member 44 may be secured to the plate 74 by means of a plurality of screw bolts 94 which have heads 96 counter-sunk in the base 44 and are threadedly screwed into the plate 74.

The vibration damping pad 40 may be held in the pad recess 98 in base 44. The pad 38 may be carried by a bracket 100, which may be moved in unison with the horn structure by being secured to the platform 60 of the horn structure, so that when the horn 46 is moved down, the pad 38 is moved simultaneously downwardly with the horn 46 to engage and dampen the upper edges of the blades 28–36.

Figure 6:
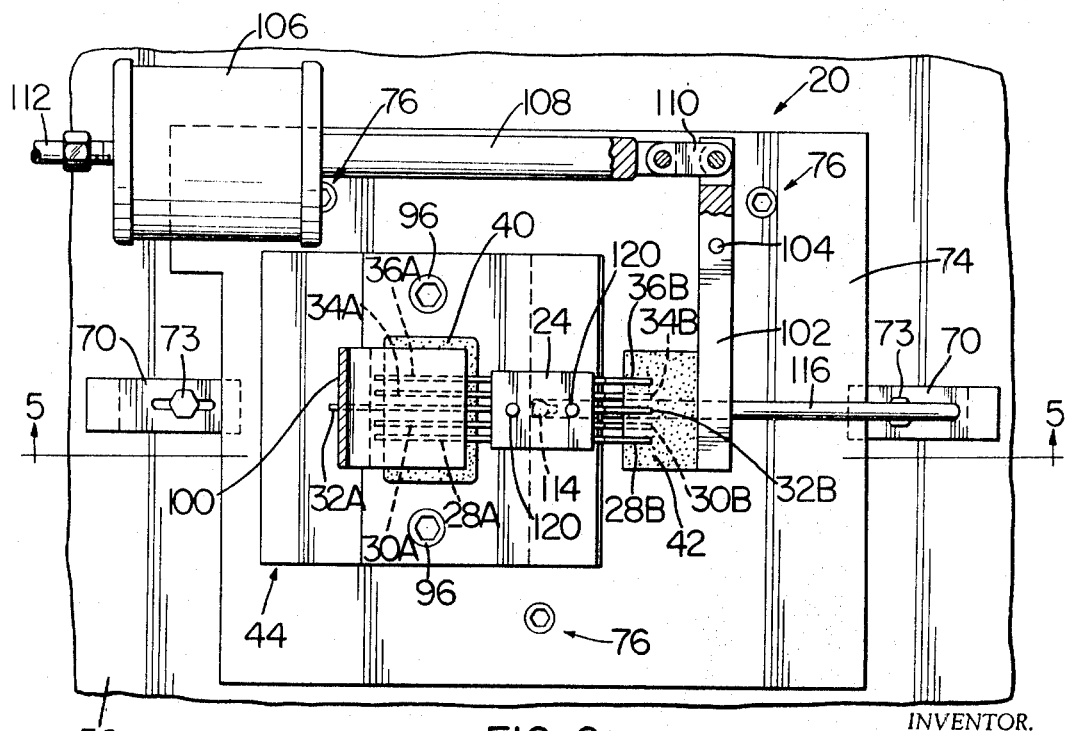
FIG. 6 is a diagrammatic cross section taken along the line 6—6 of FIG. 5.

The vibrating damping means 42 may be triangular in cross section, and may be carried by a lever 102, which is pivoted at 104, FIG. 6. The lever 102 may be actuated by a piston and cylinder construction 106 which actuates a rod 108 which is connected by link 110 to the other end of the lever 102. The piston cylinder may be operated by a fluid line 112. For example, the fluid line or pipe 112 may be a vacuum-pressure line so that when fluid pressure is applied by line 112, the damping pad 42 is moved leftwardly in FIGS. 6, against the free blade portions 28B–36B. When a vacuum is produced in the line 112, then the pad 42 is withdrawn to the position shown in FIG. 1. The fluid pressure and vacuum in pipe 112 may be automatically controlled by suitable automatic apparatus now well known.

When the welding operation has been completed, and the pad 42 has been withdrawn to the position shown in FIG. 1, then the welded switch construction may be removed from the sonic welding means 20 by upward movement of the plunger 114, which pushes upwardly against the plastic holding member 26. The plunger 114 may be moved upwardly by means of the lever 116, which is pivoted at 118, and has its left end, FIG. 5, pivotally connected to the plunger 114 in any suitable manner. The lever 116 may be biased by the compression spring 119, so that the right end of the lever 116 is raised when such right end is released, so that the plunger 114 is withdrawn from engagement with the holding member 26. The pivot 118 may be carried by the bracket 117 which is supported on the plate 74.

The holding members 24 and 26 may be provided with integral lugs or pegs 120 for the purpose of supporting the switch structure in any desired frame, structure, or the like. The horn 46 and the base 44 may be provided with cavities 122 slightly larger than the lugs or pegs 120, so that these lugs or pegs 120 are not acted upon sonically during the sonic welding of the members 24 and 26 to each other.

The horn 46 may have suitable downward flanges 124 properly to engage the plastic holding member 24. The base 44 may have upward flanges 126 properly to engage the plastic holding member 26.

The switch structure may be operated in any suitable manner. For example, the lugs or pegs 120 may be held by any suitable frame work, or other structure. A vertically operable actuator 128 may be moved against the actuator free blade portion 32A, to move it upwardly, as shown in FIG. 2. This causes the free blade portion 30A to contact the upper stationary contact 90 of blade free portion 28A. When the plunger or actuator 128 is moved downwardly to an intermediate position, if desired, then the blade free portions 30A and 32A will be spaced from the stationary contacts 90 of the free blade portions 28A and 36A, so that no current can pass through the switch structure. When the plunger 128 is moved downwardly to its lower-most position, the free blade portion 32A follows the plunger 128, and allows the free blade portions 30A and 34A to move downwardly, so that the free blade portion 34A contacts the lower contact 90 of the free blade portion 36A.

By this construction the operation of the sonic welding apparatus 20 and of its sonic welding method is greatly improved. The crystallization and fatigue of the blades is eliminated.

It is thus to be seen that a new and useful apparatus and method have been provided.

What is claimed is:

1. In combination:
relatively movable plural sonic welding means to engage and sonically weld a plural plastic holding member structure, said holding member structure to hold one or more vibratable metal blades after being welded, with said one or more blades having one or more free blade portions extending out of said holding member structure;
and resilient vibration damping pad means to engage against and dampen said one or more free blade portions to prevent crystallization and fatigue of said one or more blades while said holding member structure is being sonically welded.

2. In combination:
a first sonic welding means to engage a vibratable blade first plastic holding member;
a second sonic welding means to engage a vibratable blade second plastic holding member;
a metal vibratable blade with a blade portion held by said plastic holding members and with a free blade portion extending out from said plastic holding members;
said first and second sonic welding means imparting relative sonic welding vibrations to said plastic holding members to sonically weld said plastic holding members with said vibratable blade held by said plastic holding members;
and resilient vibration damping pad means to engage against and dampen said vibratable blade free portion to prevent crystallization and fatigue of said vibratable blade while said plastic holding members are being sonically welded.

3. In combination:
a first sonic welding means to engage a vibratable blade first plastic holding member;

a second sonic welding means to engage a vibratable blade second plastic holding member;

a metal vibratable blade with a blade portion held by said plastic holding members and with a free blade portion extending out from said plastic holding members;

said first and second sonic welding means imparting relative sonic welding vibrations to said plastic holding members to sonically weld said plastic holding members with said vibratable blade held by said plastic holding members;

and vibration damping means to dampen said vibratable blade free portion to prevent crystallization and fatigue of said vibratable blade while said plastic holding members are being sonically welded;

and other vibratable blades being held by said plastic holding members with free blade portions extending out from said plastic holding members and being dampened by said vibration damping means.

4. A combination according to claim 3 in which said vibratable blades are switch blades.

5. A combination according to claim 4 in which said free blade portions have electrical contacts.

6. In combination:

a first sonic welding means to engage a vibratable blade first plastic holding member;

a second sonic welding means to engage a vibratable blade second plastic holding member;

a metal vibratable blade with a blade portion held by said plastic holding members and with a free blade portion extending out from said plastic holding members;

said first and second sonic welding means inparting relative sonic welding vibrations to said plastic holding members to sonically weld said plastic holding members with said vibratable blade held by said plastic holding members;

and vibration damping means to dampen said vibratable blade free portion to prevent crystallization and fatigue of said vibratable blade while said plastic holding members are being sonically welded;

said blade having another free blade portion extending oppositely from said first named free blade portion, and additional vibration damping means dampening said another free blade portion.

7. A combination according to claim 6 in which a plurality of vibratable blades are held by said plastic holding members with other free blade portions extending oppositely from said first named free blade portions, and in which said additional vibration damping means dampens said other free blade portions.

8. A combination according to claim 7 in which said vibratable blades are switch blades.

9. A combination according to claim 8 in which said first named free blade portions have electrical contacts and said other free blade portions are electrical terminal connectors.

10. In combination:

a first sonic welding means to engage a vibratable blade first plastic holding member;

a second sonic welding means to engage a vibratable blade second plastic holding member;

a metal vibratable blade with a blade portion held by said plastic holding members and with a free blade portion extending out from said plastic holding members;

said first and second sonic welding means imparting relative sonic welding vibrations to said plastic holding members to sonically weld said plastic holding members with said vibratable blade held by said plastic holding members;

and vibration damping means to dampen said vibratable blade free portion to prevent crystallization and fatigue of said vibratable blade while said plastic holding members are being sonically welded;

said first sonic welding means being a sonic welding base with a damping pad to be engaged by said free blade portion, and said second sonic welding means being a sonic welding horn movable toward and away from said sonic welding base, said horn carrying a second damping pad to engage said free blade portion.

11. A combination according to claim 10 in which a plurality of vibratable blades are held by said plastic holding members with each vibratable blade having a free blade end extending out of said holding members, and each said free end being engaged by said first and second damping pads.

12. A combination according to claim 10 in which said vibratable blade has a second free blade portion extending oppositely from said first named free portion, and in which a third damping pad engages said second free blade portion.

13. A combination according to claim 11 in which said plurality of vibratable blades each has a second free blade portion extending oppositely from said first named free blade portion, and in which a third damping pad engages said second free blade portion.

* * * * *